US010907478B2

(12) United States Patent
O'Leary

(10) Patent No.: US 10,907,478 B2
(45) Date of Patent: Feb. 2, 2021

(54) GAS ENGINE COMPONENT WITH COOLING PASSAGES IN WALL AND METHOD OF MAKING THE SAME

(71) Applicant: Rolls-Royce North American Technologies Inc., Indianapolis, IN (US)

(72) Inventor: Mark O'Leary, Zionsville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 16/870,773

(22) Filed: May 8, 2020

(65) Prior Publication Data

US 2020/0271000 A1    Aug. 27, 2020

Related U.S. Application Data

(62) Division of application No. 15/487,406, filed on Apr. 13, 2017, now Pat. No. 10,683,762.

(Continued)

(51) Int. Cl.
*B22C 9/10* (2006.01)
*B22D 29/00* (2006.01)
*F01D 5/18* (2006.01)

(52) U.S. Cl.
CPC .............. *F01D 5/18* (2013.01); *F01D 5/187* (2013.01); *F01D 5/186* (2013.01);
(Continued)

(58) Field of Classification Search
CPC ........... B22C 9/10; B22C 9/106; B22C 9/108; B22D 29/00; B22D 29/001; F01D 5/18; F01D 5/186; F01D 5/187
(Continued)

(56) References Cited

U.S. PATENT DOCUMENTS 5,152,667 A   10/1992  Turner et al.
5,810,552 A   9/1998   Frasier
(Continued)

FOREIGN PATENT DOCUMENTS

EP    0 750 957 B1      3/2003
WO    WO 98/25009 A1    6/1998
WO    WO 2014/150681 A1 9/2014

OTHER PUBLICATIONS

Extended European Search Report, dated Nov. 16, 2017, pp. 1-11, Issued in European Patent Application No. 17175905.3, European Patent Office, Munich, Germany.

*Primary Examiner* — Kevin P Kerns
(74) *Attorney, Agent, or Firm* — Brinks Gilson & Lione

(57) ABSTRACT

A method of manufacturing a gas turbine engine component and the resulting component configuration are disclosed. The method includes providing a ceramic structure including a sacrificial ceramic core. The ceramic structure is inserted into a casting mold. A component material is introduced into the casting mold. The ceramic structure is removed after the component material has solidified to define a casted component having a cooling cavity of a heat exchanger segment formed in the wall structure of the component. The ceramic body of the sacrificial ceramic core defines a plurality of apertures and includes a trailing first pin and a leading first pin. The trailing first pin and the leading first pin are extended away from an inner surface of the body, and the leading first pin is spaced from the trailing first pin and in closer proximity to a leading edge of the body than the trailing first pin.

15 Claims, 6 Drawing Sheets

Related U.S. Application Data

(60) Provisional application No. 62/361,283, filed on Jul. 12, 2016.

(52) U.S. Cl.
CPC ...... *F05D 2220/32* (2013.01); *F05D 2230/21* (2013.01); *F05D 2230/211* (2013.01); *F05D 2230/31* (2013.01); *F05D 2260/204* (2013.01); *F05D 2260/213* (2013.01); *Y02T 50/60* (2013.01)

(58) Field of Classification Search
USPC .......................................... 164/132, 369, 370
See application file for complete search history.

(56) References Cited

U.S. PATENT DOCUMENTS

| | | |
|---|---|---|
| 6,530,416 B1 | 3/2003 | Tiemann |
| 6,557,621 B1 | 5/2003 | Dierksmeier et al. |
| 6,808,367 B1 | 10/2004 | Liang |
| 6,984,102 B2 | 1/2006 | Bunker et al. |
| 7,141,812 B2 | 11/2006 | Appleby et al. |
| 7,534,089 B2 | 5/2009 | Liang |
| 7,544,044 B1 | 6/2009 | Liang |
| 8,813,812 B2 | 8/2014 | Kamel et al. |
| 8,858,159 B2 | 10/2014 | Piggush et al. |
| 8,920,122 B2 | 12/2014 | Lee |
| 9,133,716 B2 | 9/2015 | Liang |
| 9,267,381 B2 | 2/2016 | Morris et al. |
| 10,683,762 B2 * | 6/2020 | O'Leary .................. F01D 5/18 |
| 2003/0133799 A1 | 7/2003 | Widrig et al. |
| 2011/0132562 A1 | 6/2011 | Merrill et al. |
| 2011/0132563 A1 | 6/2011 | Merrill et al. |
| 2011/0132564 A1 | 6/2011 | Merrill et al. |
| 2013/0243575 A1 | 9/2013 | Zelesky et al. |
| 2014/0010666 A1 | 1/2014 | Hudson et al. |
| 2014/0342175 A1 | 11/2014 | Morrison et al. |
| 2015/0075746 A1 | 3/2015 | Lee et al. |
| 2015/0110611 A1 | 4/2015 | Bergholz |

* cited by examiner

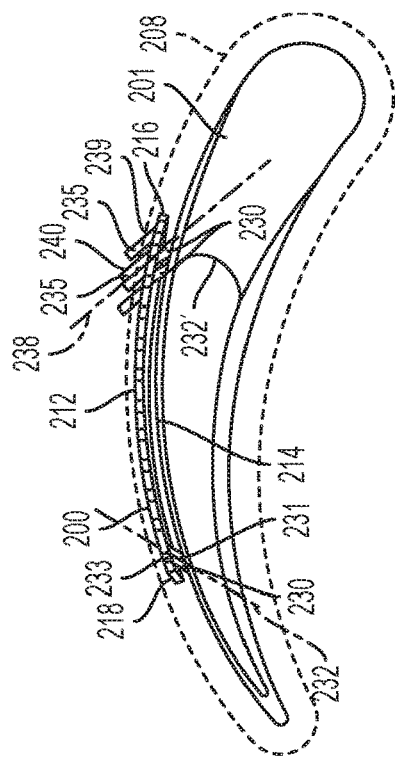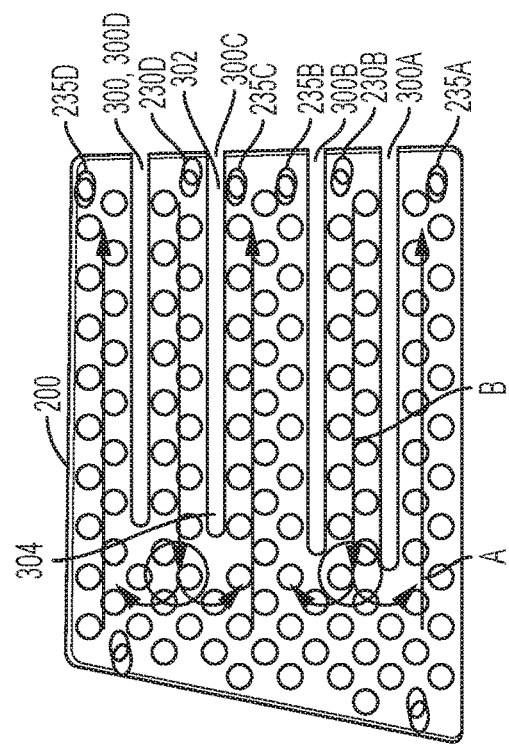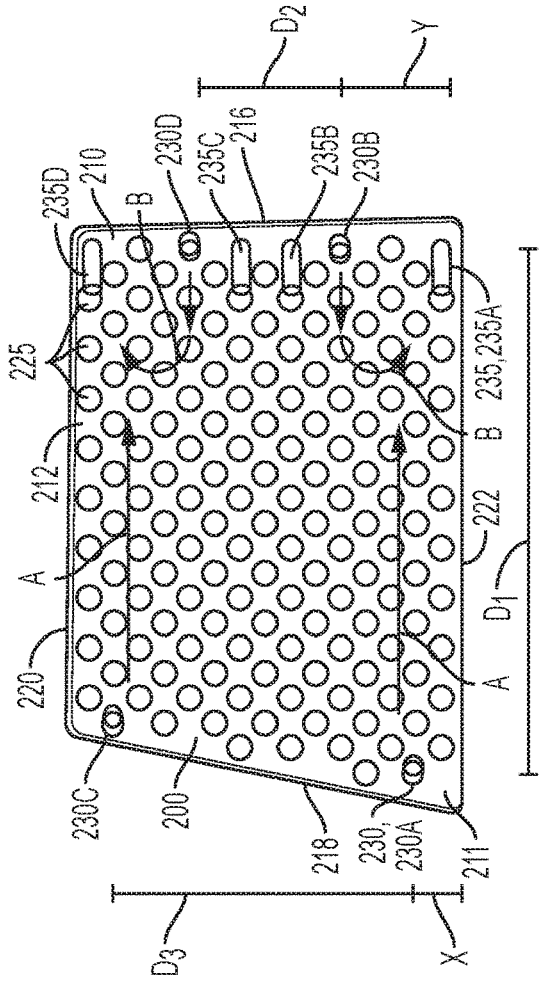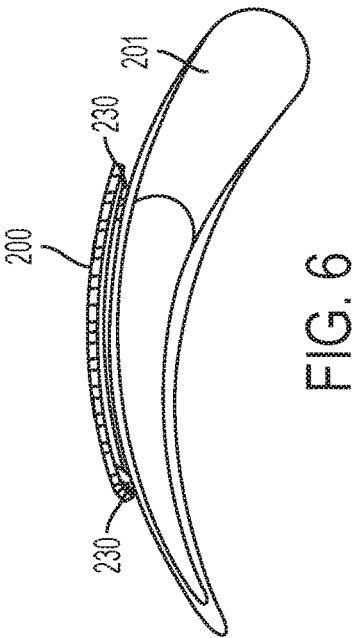

GAS ENGINE COMPONENT WITH COOLING PASSAGES IN WALL AND METHOD OF MAKING THE SAME

CROSS-REFERENCE TO RELATED APPLICATION

This application is a divisional application of U.S. patent application Ser. No. 15/487,406 filed Apr. 13, 2017, now U.S. Pat. No. 10,683,762, which claims priority under 35 USC § 119(e) to U.S. provisional application 62/361,283, entitled "GAS ENGINE COMPONENT WITH COOLING PASSAGES IN WALL AND METHOD OF MAKING THE SAME" filed Jul. 12, 2016, both of which are entirely incorporated by reference.

TECHNICAL FIELD

This disclosure relates to components for gas turbine engines and methods of making the same, and in particular to casting gas turbine engine components.

BACKGROUND

Gas turbine engine components, such as turbine blades or vanes, experience high thermal loads due to being exposed to hot gases during engine operation. Overexposure to heat or higher temperatures can have significant impact to the lifecycle of the component. As a result, heat management strategies have been used to provide cooling to such components. One such strategy is to configure the component to allow for transpirational cooling which requires the addition of internal cooling channels and passages formed in the component. Investment casting is a well-known technique for the production of such components with cooling cores. Although investment casting techniques utilize individual ceramic cores for producing many types of cast gas turbine engine components, the need remains for an improved ceramic casting core and methods of use.

BRIEF SUMMARY

A method of manufacturing a gas turbine engine component is disclosed. One step includes providing a ceramic structure including a sacrificial ceramic core. The sacrificial ceramic core has a ceramic body corresponding to a cooling cavity of a heat exchanger segment that will be formed in the wall structure of the final cast component. The ceramic body has an exterior surface defined by an outer surface and an inner surface interconnected to one another by a leading edge, a trailing edge, a tip facing edge and a base facing edge. The ceramic body defines a plurality of apertures extending between the outer surface and the inner surface. The plurality of apertures corresponds to a plurality of pedestals within the cooling cavity of the heat exchanger segment. The ceramic body includes a trailing first pin and a leading first pin corresponding to a first inlet orifice and a second inlet orifice leading to the cooling cavity of the heat exchanger segment. The trailing first pin and the leading first pin are extended away from the inner surface. The leading first pin is spaced from the trailing first pin and in closer proximity to the leading edge than the trailing first pin. Another step includes inserting the ceramic structure into a casting mold. Another step includes introducing a component material into the casting mold. Another step includes removing the ceramic structure after the component material has solidified to define a casted component having the cooling cavity of the heat exchanger segment. A gas turbine engine component and a sacrificial ceramic core used to form a heat exchanger segment within a casted component are also disclosed.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 4 illustrates an example of a sacrificial ceramic core used in the manufacture of a component for the gas turbine engine.

FIG. 5 is an end view of an example of a sacrificial ceramic core positioned along a ceramic mass, during an intermediate step of the manufacture of a component for the gas turbine engine.

FIG. 6 is an end view of another example of a sacrificial ceramic core positioned along a ceramic mass, during an intermediate step of the manufacture of a component for the gas turbine engine.

FIG. 7 illustrates another example of a sacrificial ceramic core used in the manufacture of a component for the gas turbine engine.

DETAILED DESCRIPTION

Disclosed herein are examples of components for gas turbine engines and methods of manufacturing the same that may be used in any industry, such as, for example, to power aircraft, watercraft, power generators, and the like. The components have improved cooling configurations such that the components withstand high temperature environments that may exceed 2,500 degrees Fahrenheit. For example, the components include a wall structure having various configurations of cooling cavities of thin heat exchanger segments described herein to permit heat transfer coefficients to be manipulated across different regions of the component. The cavity configuration including the inflow and outflow orifices may be shaped, sized and include any number of pedestals, partitions, or diffusers to produce such varying heat transfer coefficient across the component's region. Such cavity configurations may be fabricated as three-dimensional ceramic cores, which are used in investment castings for producing the component into final form. However, such three-dimensional ceramic cores may be fragile and susceptible to cracking or breaking during the process of fabricating the cores, creating and curing the wax patterns or pouring the molten metal alloy into a casting mold. Spacing the arrangement of pins coupling between the ceramic core and the ceramic core mass may increase the stability of the core and reduce core deflection during the processing. As a result, along with other benefits, the quality of the wall and its thickness that surrounds the cooling cavity and the heat transfer capability of the thin heat exchanger from counter-flow cooling within the cavity may be improved.

Figure 1:
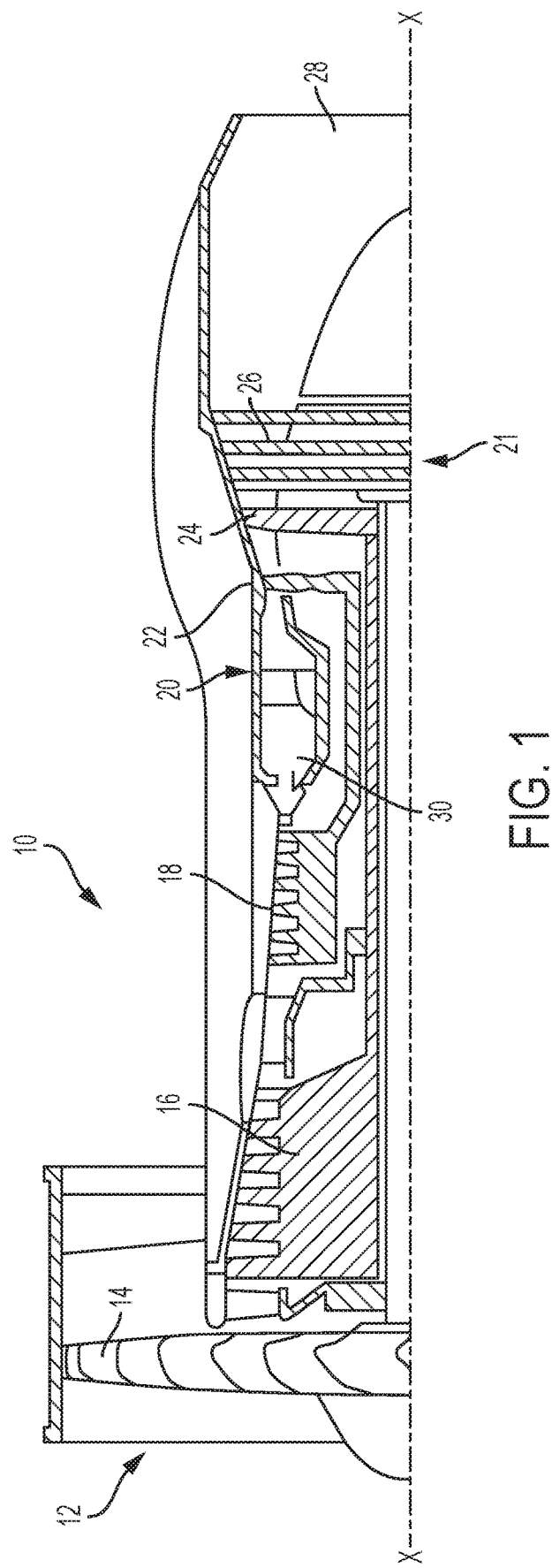
FIG. 1 illustrates an exemplary gas turbine engine disposed about a longitudinal axis X-X.

With reference to FIG. 1 a gas turbine engine generally indicated at 10 includes, in axial flow series, an air intake 12, a propulsive fan 14, an intermediate pressure compressor 16, a high pressure compressor 18, combustion equipment 20, turbine section 21 (a high pressure turbine 22, an intermediate pressure turbine 24, a low pressure turbine 26, or a combination thereof) and an exhaust nozzle 28 disposed about a longitudinal axis (X-X) of the gas turbine engine 10. The gas turbine engine 10 works in the conventional manner so that air entering the air intake 12 is accelerated by the propulsive fan 14 to produce two air flows, a first air flow into the intermediate pressure compressor 16 and a second airflow which provides propulsive thrust. The intermediate pressure compressor 16 compresses the air flow directed into it before delivering the air to the high pressure compressor 18 where further compression takes place.

The compressed air exhausted from the high pressure compressor 18 is directed into the combustion equipment 20 via a diffuser inlet where it is mixed with fuel and the mixture combusted. The resultant hot combustion products then expand through and thereby enter via a turbine nozzle of the turbine section 21 and drive the high, intermediate and low pressure turbines 22, 24 and 26 before being exhausted through the exhaust nozzle 28 to provide additional propulsive thrust. The high, intermediate and low pressure turbines 22, 24 and 26 respectively drive the high and intermediate pressure compressors 16 and 18 and the fan 14 by suitable interconnecting shafts.

Fuel is directed into the combustor 30 through a number of fuel injectors (not shown) located at the upstream end of the combustor 30. The fuel injectors are circumferentially spaced around the engine 10 and serve to provide fuel into air derived from the high pressure compressor 18. The resultant fuel and air mixture is then combusted within the combustor 30.

Figure 2:
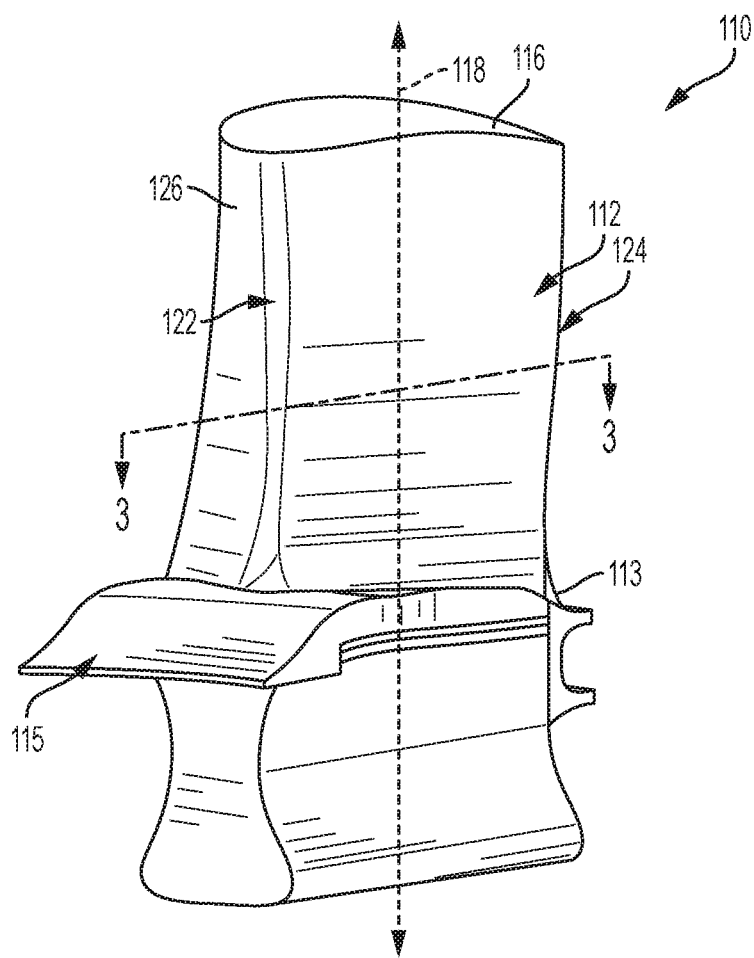
FIG. 2 is an illustrative view of an example of a component in the form of a gas turbine engine blade for the gas turbine engine in FIG. 1.

Referring now to FIG. 2, a component 110 adapted for use in the gas turbine engine 10, such as, but not limited to, any of the turbines of the turbine section 21 illustratively is shown as a turbine blade including an airfoil 112. The airfoil 112 is generally elongated structure extending upwardly away from an airfoil base 113 coupled to a platform 115 of the component 110 along a blade axis 118 to an airfoil tip 116. Although only one component 110 of a blade (and one airfoil 112) is shown in FIG. 2, the airfoil 112 is one of a plurality of airfoils 112 included in the turbine section 21. The plurality of airfoils 112 are supported by and circumferentially spaced about a disk that is rotatable about the longitudinal axis (X-X) of the gas turbine engine 10. Fluid is directed toward the airfoils 112 from a plurality of static or stationary vanes (not shown) included in the turbine section 21. Fluid flows from a leading edge 122 of the airfoil 112 to a trailing edge 124 of the airfoil 112, thereby causing the plurality of turbine blades of the turbine section 21 to rotate to drive other rotating components of the gas turbine engine 10.

Although the component 110 is shown as a turbine blade, the component 110 may include other hot gas path engine components, such as, for example, end walls, shrouds, or static turbine vanes (not shown) adapted for use in the gas turbine engine and including a wall structure similar to the wall structure 140 of the airfoil 112. For example, when the component 110 is a turbine vane, the vane airfoil or more than one vane airfoil may be extended between a pair of outer and inner platforms, rather than one, which may be extended circumferentially about the longitudinal axis (X-X) of the gas turbine engine to form a ring. A plurality of vane airfoils may be circumferentially spaced about the longitudinal axis (X-X) such that the vane airfoils and the platforms cooperate to direct fluid flowing through the turbine section toward the airfoils 112 of the turbine blade and other downstream sections of the gas turbine engine.

Figure 3:
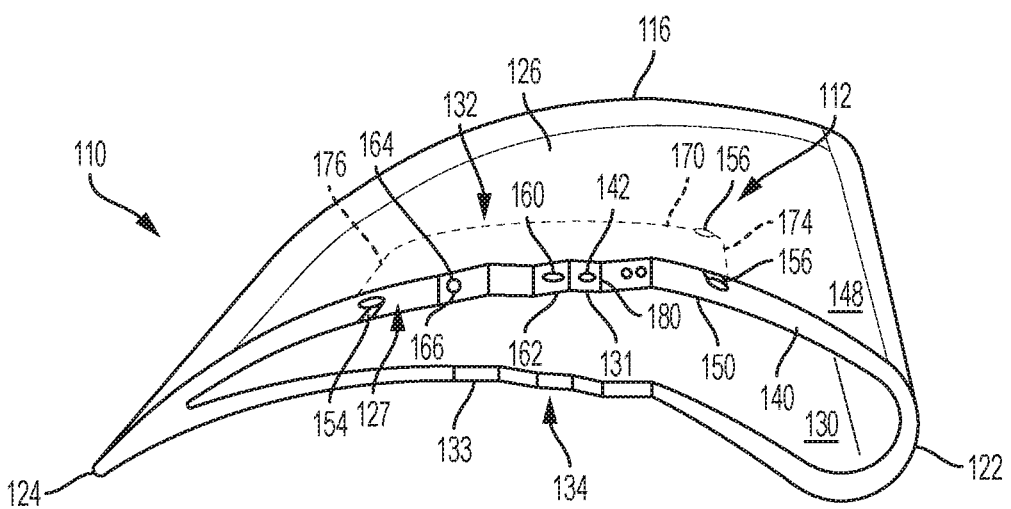
FIG. 3 is a cross-sectional view of the component in FIG. 2, taken along line 3-3, depicting a heat exchanger segment.

Referring to FIG. 3, a cross-sectional view of the airfoil 112 taken along a line 3-3 in FIG. 2 is shown. The airfoil 112 includes an outer shell 126 of a metal alloy, disposed along the blade axis 118 to define an internal core 130 extending along the blade axis 118. The outer shell 126 extends along the blade axis 118 and fully wraps around the blade axis 118. The outer shell 126 may be shaped to have a convex portion 131 forming a suction side 132 of the airfoil 112 and a concave portion 133 forming a pressure side 134 of the airfoil 112 opposite the suction side 132. The core 130 is surrounded by the outer shell 126 and is substantially hollow in the illustrative embodiment to allow for the flow of cooling air from, for example, at least one of the compressors, through the core 130 of the airfoil 112. The core 130 being substantially hollow means the core 130 may be entirely hollow or may be at least partially filled with an open-cell foam or other porous material and/or internal support ribs that still permit cooling air flow with the core 130. The outer shell 126 may be an integrally formed unit or may be made of pieces that are joined or otherwise attached together.

As will be described, the airfoil 112 is adapted for a cooling system to help the component 110 withstand hot gas temperatures and potentially prolong the service life of the component 110. The outer shell 126 is defined by a wall structure 140 configured as one or more heat exchanger segments or units 127 integrated within the wall structure 140 along any portion of the suction side 132, the pressure side 134, or both of the outer shell. The heat exchanger segment 127 formed in the wall structure 140 may include an internally formed cooling cavity, generally shown as 142, surrounded by two or more walls, such as, for example, an outer wall 160 and an inner wall 162. The wall structure 140 includes an exterior surface 148 and an interior surface 150, opposite the exterior surface 148. The exterior surface 148 and the interior surface 150 are separated from one another to define a wall structure thickness, as shown in FIG. 2. The exterior surface 148 is positioned radially outwardly of the core 130 relative to the interior surface 150 such that the exterior surface 148 faces away from the core 130 and the interior surface 150 faces toward the core 130. Further, the inner wall 162 defines a plurality of inlet orifices 154 that is in fluid communication with the core 130 and the cavity 142 for passing cooling air from the core 130 to the cavity 142. The outer wall 160 defines a plurality of outlet orifices 156 that is in fluid communication with the cavity 142 and exterior to the component 110 for passing cooling air from the cavity 142 to exit out of the airfoil 112 where the cooling air traverses along the exterior surface 148 of the airfoil 112. To this end, the core 130 may be arranged in various configurations for receiving and passing cooling air. In an example, the core 130 may form a cooling chamber that extends through the base 113 and the airfoil 112 that is coupled to a cooling air source, as known in the art.

The outer wall 160 and the inner wall 162 may be generally follow the same contour of the respective exterior and interior surfaces 148, 150, and together define the cavity 142. The outer wall 160 is defined by the exterior surface 148 of the wall structure 140 and a cavity facing surface 164, opposite the exterior surface 148. The inner wall 162 is defined by the interior surface 150 of the wall structure 140 and a cavity facing surface 166, opposite the interior surface 150. As illustrated in FIG. 3, the cavity 142 may be generally defined by the cavity facing surfaces 164, 166 and further internal surfaces. For example, the cavity 142 may be further defined by a tip internal surface 170, a base internal surface (not shown), a leading internal surface 174 and a trailing internal surface 176. The tip internal surface 170 is oriented opposite the base internal surface and in closer proximity to the tip 116 than the base 113 of the airfoil 112. The trailing internal surface 176 is oriented opposite to the leading internal surface 174 and in closer proximity to the trailing edge 124 than the leading edge 122 of the airfoil 112.

A plurality of pedestals 180 may extend between the outer wall 160 and the inner wall 162 to support and maintain relative positions of the walls. The pedestals 180 may also function as a thermal conductor for removing heat from the outer wall 160 for cooling within the cavity 142 or even transferring heat to the inner wall 162 for additional cooling from the core 130. The pedestals 180 may have an elongated body formed with a variety of cross-sectional shapes, such as, but not limited to, circular, rectangular, triangular, elliptical, oval, star-shape or other shapes. In an example, the pedestals 180 may include the same shape having an equal cross-sectional area. In other example, the pedestals 180 may have different shapes and/or vary cross-sectional areas. The arrangement and number of the pedestals 180 may define intricacies of the shape of cavity 142 to allow sufficient cooling air flow through the cavity 142 to cool the outer wall 160 and the inner wall 162. For example, the pedestals 180 may be distributed along different rows in a staggered, alternating pattern such that the cooling air may be diffused through the cavity 142 to remove heat.

As will be described, the airfoil 112 and the wall structure 140 may be formed using ceramic core investment casting techniques. Particularly, the cavity 142 defined in the wall structure 140 may be formed from the fabrication of a sacrificial ceramic core 200 appropriate for casting intricate structures within the wall structure 140 formed of a metal alloy described herein.

FIG. 4 depicts a plan view of an example of the sacrificial ceramic core 200 that may be used to define the heat exchanger segment 127 and the cavity 142 of the airfoil 112. FIG. 5 depicts an end view of the sacrificial ceramic core 200 looking in the tip direction prior to adding the molten metal alloy. The sacrificial ceramic core 200 is spaced above a ceramic mass 201 that is in the shape of the internal core 130 of the final form of the airfoil 112. This spacing would be sized for the desired thickness of the inner wall 162. As will be described later, a plurality of first pins 230 may be coupled between the sacrificial ceramic core 200 and the ceramic mass 201, and a plurality of second pins 235 are shown extending from the sacrificial ceramic core 200 in a direction away from the ceramic mass 201. The approximate location of the mold cavity (shown generally by dashed lines 208 in FIG. 5) relative to the sacrificial ceramic core 200 and the ceramic mass 201 illustrates the formation of the outer shell 126 of the airfoil 112.

In one example, a body 210 of the sacrificial ceramic core 200 includes an exterior surface 211 being defined by an outer surface 212 and an inner surface 214 (shown in FIG. 5) interconnected to one another by a leading edge 216, a trailing edge 218, a tip facing edge 220 and a base facing edge 222. The body 210 as shown may be formed to have a curvature to match the contour of the respective exterior and interior surfaces 148, 150 of the airfoil 112. The outer surface 212 may correspond to the cavity facing surface 164 of the outer wall 160, and the inner surface 214 may correspond to the cavity facing surface 166 of the inner wall 162. The leading edge 216 may correspond to the leading internal surface 174, the trailing edge 218 may correspond to the trailing internal surface 176, the tip facing edge 220 may correspond to the tip internal surface 170, and the base facing edge 222 may correspond to the base internal surface of the cavity 142. In other words, the exterior surface 211 of the sacrificial ceramic core 200 corresponds to the general boundary of the cavity 142. For example, wherever there is ceramic material forming the sacrificial ceramic core 200, the ceramic material will eventually be removed, thereby defining an aspect of the configuration and spatial shape of the cavity 142. The boundary of the cavity 142, the shape, size and number of pedestals, partitions, and/or diffuser elements may be selected to produce the desired heat transfer coefficient across a region of the component 110. The outer wall 160 and the inner wall 162 of the wall structure 140 follow the contour of the convex portion 131 (or concave portion 133) of the outer shell 126.

A plurality of apertures 225 may be formed in the sacrificial ceramic core 200 and extend through the outer surface 212 and the inner surface 214. The apertures 225 may correspond to the pedestals 180, by permitting the molten metal alloy to flow through the apertures 225 during the casting process and eventually solidify to form the pedestals 180. To this end, the shape, size and number of apertures 225 correspond to the shape, size and number of the pedestals 180. In one example, the apertures 225 may be arranged in a series of linear rows disposed adjacent to one another. In another example, the apertures 225 in a first linear row may be offset or staggered with the apertures 225 in an adjacent, second row. The size of the apertures may such that an aperture 225 in a first linear row may encroach or overlap the aperture 225 in an adjacent, second linear row.

As will be described, pins may be used to define the inlet orifices 154 and the outlet orifices 156. The pins may be the same material as the sacrificial ceramic core 200. Alternatively or in addition, one or more of the pins may comprise a material different than the sacrificial ceramic core 200. In one example, the pins have an elongated body formed with a variety of cross-sectional shapes, such as, but not limited to, circular, rectangular, triangular, elliptical, oval, star-shape or other shapes. Pins may be shaped the same having an equal cross-sectional area. Alternatively, one or more pins may have different shapes than other pins and/or having differing cross-sectional areas. For example, in FIG. 5, the inlet orifices 154 of the airfoil 112 may be formed by any number of first pins 230 extending away from the inner surface 214 of the sacrificial ceramic core 200 by a length corresponding to the thickness of the inner wall 162. The inlet orifices 154 may be disposed normal or obliquely angled about a first inlet axis 232 relative to the cavity facing surface 166 and the interior surface 150. When compared to an inlet orifice disposed normal to such surface, inlet orifices 154 being obliquely angled may further reduce flow resistance as the cooling air moves from the internal core 130 of the airfoil 112.

To this end, at least one of the first pins 230 may be oriented to define the eventual desired orientation of the inlet orifice 154 about the first inlet axis 232. For example, at least one of the first pins (shown in FIG. 4 as the first pins 230A, 230C) is shown extending at an oblique angle relative (that is, not normal to) to the inner surface 214 to place the core end 231 of the first pins 230A, 230C closer to the trailing edge 218 than the cavity end 233 of the first pins 230A, 230C. The core end 231 and the cavity end 233 of the first pins may be beveled. At least one of the first pins (shown in FIG. 4 as the first pins 230B, 230D) corresponding to inlet orifices is shown extending at an oblique angle about a second inlet axis 232' relative (that is, not normal to) to the inner surface 214 to place the core end 231 of the first pins 230B, 230D closer to the leading edge 218 than the cavity end 233 of the first pins 230B, 230D. The first pins 230 being obliquely angled may form a wider base for the sacrificial ceramic core 200 to improve the stability of the sacrificial ceramic core 200 during the manufacturing and handling processes. The inlet orifices 154 may be disposed obliquely angled about the second inlet axis 232' relative to the cavity facing surface 166 and the interior surface 150. Alternatively, one or more of inlet orifices formed by the first pins may be obliquely angled in the opposite direction than what is shown. Alternatively, the first pins 230 may be extended obliquely at a compound angle. That is, for example, the core end 231 of the first pin 230A is closer to the trailing edge 218 and to the base edge 222 than the cavity end 233 of the first pin 230A, and so forth for the other first pins and their respective edges.

The outlet orifice 156 of the airfoil 112 may be formed by any number of second pin 235 extending away from the outer surface 212 of the sacrificial ceramic core 200 by a length corresponding the thickness of the outer wall 160.

The outlet orifices 156 may be disposed normal or obliquely angled about an outlet axis 238 relative to the cavity facing surface 164 and the exterior surface 148. When compared to the outlet orifice disposed normal to such surfaces, the outlet orifices 156 that are obliquely angled may further reduce flow resistance as the cooling air moves out from the cavity 142 to the exterior of the airfoil 112. To this end, at least one of the second pins 235 may be oriented to define the eventual desired orientation of the outlet orifice 156 about the outlet axis 238. For example, at least one of the second pins (shown in FIG. 4 as the second pins 235A, 235B, 235C, 235D) is shown extending at an oblique angle relative (that is, not normal to) to the outer surface 212 to place the cavity end 239 of the second pins closer to the leading edge 216 than the exterior end 240 of the second pins. Alternatively, at least one of the second pins may extend at an oblique angle relative to the outer surface 212 to place the cavity end 239 of the second pins closer to the trailing edge 218 than the exterior end 240 of the second pins.

Alternatively, the outlet orifice 156 of the airfoil 112 may be formed after the casting process of the airfoil 112 by machining or drilling to form the orifice. Like the second pin orientation, the outlet axis 238 of the outlet orifice 156 when machined may extend perpendicular or obliquely to the outer surface 212. FIG. 6 shows an example of the sacrificial ceramic core 200 without the second pins 235 so that the outlet orifices 156 may be eventually machined after the casting process. Machining of the outlet orifices 156 may allow for better control of the angle of the outlet axis 238 and may allow for tighter control of the variation of hole diameter when compared to cast holes using the second pins 235. When the sacrificial ceramic core 200 is secured to the ceramic mass 201 with any one of the first pin arrangements of the first pins 230 described herein, deflection of the sacrificial ceramic core during the casting processes may be further inhibited with omission of the second pins 235, that is, by machining the outlet orifices 156. In some examples, the interaction between the second pins 235 and the ceramic pattern shell that may be created as part of the investment casting process may create additional loads into the sacrificial ceramic core 200 during the processing.

The placement of the inlet orifices 154 relative to the outlet orifices 156, and particularly the arrangement of the first pins 230, may help improve the structural quality and heat transfer of the component 110. Particularly, a first pin arrangement may include the placement of the first pin 230A corresponding to a first inlet orifice spaced from another first pin (referred to now as 230B) corresponding to a second inlet orifice by a lateral distance D1 such that the first pin 230B is closer to the leading edge 122 of the airfoil 112 than the first pin 230A. The lateral distance D1 is measured in a lateral direction between the leading edge 122 and the trailing edge 124, perpendicular to the blade axis 118, and may be suitable to inhibit a deflection and improve the stability of the sacrificial ceramic core 200 during the manufacture and handling processes. The placement of another first pin 230D corresponding to a third inlet orifice may be spaced from the first pin 230A corresponding to the first inlet orifice by a lateral distance, which is shown in FIG. 4 as the same as the lateral distance D1, although the lateral distance may be less than or greater than the lateral distance D1.

In another first pin arrangement, at least another first pin 230C and/or 230D may be spaced by an axial distance from the respective first pin 230A and/or 230B, in addition to the lateral spacing of the first pins 230A, 230B, to further inhibit such deflection. For example, the placement of the first pin 230D corresponding to the third inlet orifice may be spaced by an axial distance D2 from the first pin 230B corresponding to the second inlet orifice. The placement of the first pin 230C corresponding to the fourth inlet orifice may be spaced from the first pin 230A by an axial distance D3. The axial distance D3 may be the same as the axial distance D2. In the example shown in FIG. 4, the axial distance D3 is greater than the axial distance D2. The axial distances are measured along an axial direction of the blade axis 118.

FIG. 4 shows an example of a first pin arrangement with four first pins 230A, 230B, 230C, 230D. First pins 230A, 230C are shown disposed along the trailing edge 218 and the first pins 230B, 230D are shown disposed along the leading edge 216. Particularly, the first pin 230A may be disposed along the trailing edge 218 spaced from the base facing edge 222 by a distance X. The first pin 230C may be disposed along the trailing edge 218 spaced from the tip facing edge 220 by a distance that may be equal to the distance X. The first pin 230B may be disposed along the leading edge 216 spaced from the base facing edge 222 by a distance Y. In one example, the distance Y is greater than the distance X. The first pin 230D may be disposed along the leading edge 216 spaced from the tip facing edge 220 by a distance that may be equal to the distance Y. The distance Y of the offset of both first pins 230B, 230D may locate the corresponding inlet orifices toward the center of the leading edge 216. When the first pins 230A, 230B are placed at different locations and separated by the lateral distance D1, cooling air enters the cavity 142 through the inlet orifices located along both sides of the heat exchanger segment 127 such that cooling air streams A, B (shown superimposed on the sacrificial ceramic core 200) are in a counterflow configuration and impinge against each other within the cavity 142 and may improve the performance of the heat exchanger segment 127. Other arrangements of the first pins 230 may be possible, including any number of the first pins 230 at one end of the heat exchanger segment 127 and any number of the first pins 230 at the opposite end of the heat exchanger segment 127. Furthermore, the first pins 230 may be distributed anywhere on the ceramic body exterior surface 211—the tip facing edge 220, base facing edge 222, leading edge 216, trailing edge 218, and anywhere along the intermediate of the body 210 between the edges 216, 218, 220, 222. The size of the inlet orifices may also vary, which may depend on the cross-sectional area of the first pins 230 that vary along different locations of the ceramic body.

FIG. 4 shows an example of a second pin arrangement, corresponding the outlet orifice arrangement, with four second pins 235A, 235B, 235C, 235D disposed along the leading edge 216. Particularly, the second pin 235A corresponding to a first outlet orifice may be disposed along the leading edge 216 proximate the base facing edge 222. The second pin 235D corresponding to a fourth outlet orifice may be disposed along the leading edge 216 proximate the tip facing edge 220. Second pins 235B, 235C corresponding to second and third outlet orifices may be located in between the second pins 235A, 235D. In one example, the second pin 235A corresponding to the first outlet orifice may be disposed closer to the base facing edge 222 than the second pin 235A corresponding to the second outlet orifice and the first pins 230B, 230D corresponding to the second and third inlet orifices, respectively. Also, the first pin 230D corresponding to the third inlet orifice may be disposed closer to the tip facing edge 220 than the second pins 235A, 235B corresponding to the first and second outlet orifices and the first pin 230B.

In one example, the first pin 230B corresponding to the second inlet orifice may be shown disposed between the second pins 235A, 235B corresponding to the first and second outlet orifices, and the first pin 230D corresponding to the third inlet orifice may be shown disposed between the second pins 235C, 235D corresponding to the third and fourth outlet orifices. In one example, the second pins 235B, 235C corresponding to the second and third outlet orifices are shown disposed between the first pins 230B, 230D corresponding to the second and third inlet orifices.

In one example, the second pin 235D corresponding to the fourth outlet orifice may be disposed closer to the tip facing edge 220 than the second pins 235A, 235B, 235C corresponding to the first, third and second outlet orifices and the first pins 230B, 230D corresponding to the second and third inlet orifices. The second pin 235B corresponding to the second outlet orifice may be disposed closer to the base facing edge 222 than the second pins 235C, 235D corresponding to the third and fourth outlet orifices and the first pin 230D corresponding to the third inlet orifice, and the second pin 235C corresponding to third outlet orifice may be disposed closer to the tip facing edge 220 than the second pins 235A, 235B corresponding to the first and second outlet orifices and the first pin 230B corresponding to the second inlet orifice.

The heat exchanger segment 127, that is, the sacrificial ceramic core 200, may include other features to improve the performance of the heat exchanger segment. For example, as shown in FIG. 7, the heat exchanger segment 127 further includes a series of partitions that are defined by a series of channels 300 defined in the sacrificial ceramic core 200. The channels 300 correspond to the partitions by permitting the molten metal alloy to flow through the sacrificial ceramic core 200 and eventually solidify to form the partitions within the heat exchanger segment 127. The channels 300 are spaced from one another to define passageways between the partitions to facilitate direction of airstream flow such that the cooling air coming from the inlet orifices 154 does not immediately exit out of the outlet orifices 156, thus short circuiting the heat exchanger segment. Adjacent channels are shown extending parallel to one another to define a flow passageway having a constant cross-sectional area. Alternatively, the adjacent channels may converge in a manner to define a flow passageway having a variable cross-sectional area to improve cooling air flow travel within the cavity. The channels 300 may be extended between the outer wall 160 and the inner wall 162 and extend in the lateral direction between the leading edge 216 and the trailing edge 218. In one example, the channels 300 includes a first end 302 at the leading edge 216 and a second end 304 disposed at a location (for example, between about 50% and 80% of the lateral length) between the leading edge 216 and the trailing edge 218. The channels 300 may be linear or wavy. The arrangement and number of the channels 300 may define intricacies of the shape of cavity 142 to allow sufficient cooling air flow through the cavity 142 to cool the outer wall 160 and the inner wall 162.

Any number of channels may be included. In one example, the channel 300A may be disposed between the second pin 235A corresponding to the first outlet orifice and the first pin 230B corresponding to the second inlet orifice. The channel 300B may be disposed between the first pin 230B corresponding to the second inlet orifice and the second pin 235B corresponding to the second outlet orifice. The channel 300C may be disposed between the second pin 235C corresponding to the third outlet orifice and the first pin 230D corresponding to the second inlet orifice. The channel 300D may be disposed between the first pin 230D corresponding to the second inlet orifice and the second pin 235D corresponding to the fourth outlet orifice. In one example, the second pins 235B, 235C corresponding to the second and third orifices may not have the channel disposed between them allowing either orifices to receive the cooling air flow.

Figure 8:
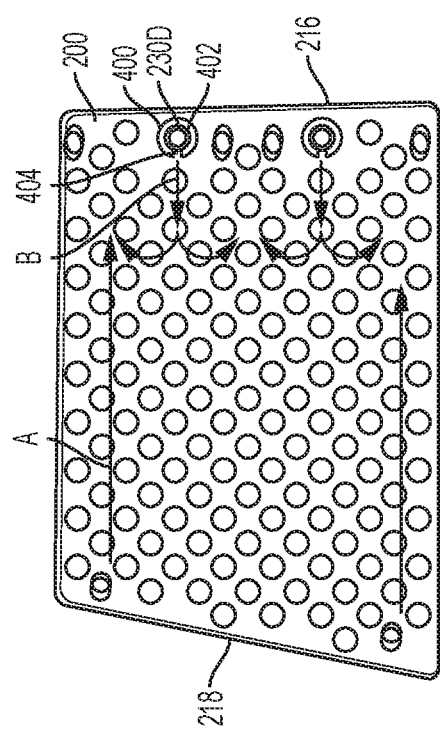
FIG. 8 illustrates another example of a sacrificial ceramic core used in the manufacture of a component for the gas turbine engine.

FIG. 8 depicts another example of the sacrificial ceramic core 200 used to form the heat exchanger segment 127 including a diffuser element that may be formed by a curved or C-shaped opening 400 defined by the sacrificial ceramic core 200 and located at the end of the first pin 230B that corresponds to the inlet orifice 154. The C-shaped opening 400 permits the molten metal alloy to flow through the sacrificial ceramic core 200 and eventually solidify to form the curved wall of the diffuser element within the heat exchanger segment 127 to provide further support to the sacrificial ceramic core 200. The C-shaped opening 400 may extend between the outer wall 160 and the inner wall 162. The interior 402 defined by C-shaped opening 400 corresponds to a lumen of the diffuser element that is in fluid communication with the inlet orifice. The bridge 404 separating the C-shaped opening 400 from complete closure corresponds to a window of the diffuser element. The window may be located to face toward the trailing edge 218. In its final form, cooling air enters into the lumen of the diffuser element and exits the lumen via the window. The bridge 404 corresponding to the window may be sized to allow the cooling air to travel farther away from the leading edge 216 than would be possible without the diffuser element. Each inlet orifice 154 may have a different configuration of the diffuser element. Depending on the cooling strategy, the C-shaped opening 400 may be fully enclosed to define a ring-shaped opening to eliminate cooling air flow from passing through the respective inlet orifice. The size and shape of the bridge 404 may vary among the associated inlet orifices to provide inlet orifices with different cooling characteristics.

Figure 9:
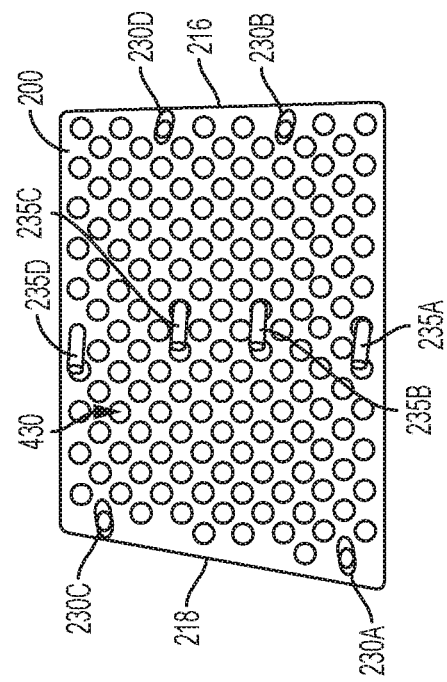
FIG. 9 illustrates another example of a sacrificial ceramic core used in the manufacture of a component for the gas turbine engine.

FIG. 9 depicts another example of an outlet orifice arrangement that may comprise of the second pins or machined orifices as described herein. For example, the outlet orifices may be disposed in an intermediate zone between the inlet orifices. Here, four second pins 235A, 235B, 235C, 235D or machined orifices may be disposed in an intermediate zone 430 disposed between the leading edge 216 and the trailing edge 218. In one example, the four second pins 235A, 235B, 235C, 235D may be disposed at the center between the first pins 230A, 230C and the first pins 230B, 230D. For more even distribution of airflow, the second pins may be staggered. For example, the second pin 235A may be disposed closer to the first pin 230A than the first pin 230B, the second pin 235B may be disposed closer to the first pin 230B than the first pin 230A, the second pin 235C may be disposed closer to the first pin 230D than the first pin 230C, and the second pin 235D may be disposed closer to the first pin 230C than the first pin 230D.

Figure 10:
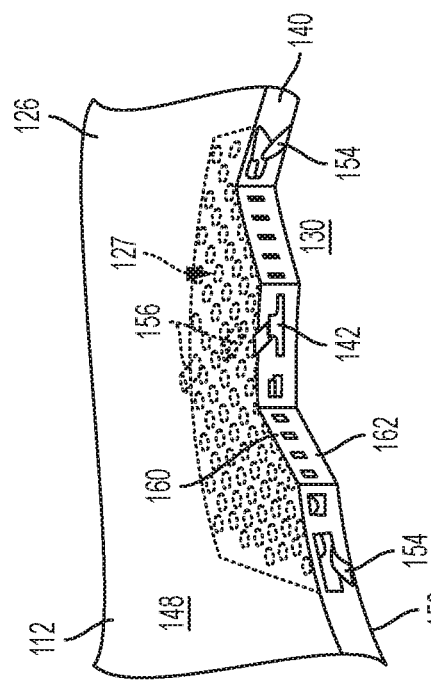
FIG. 10 is a cross-sectional view of a component including depicting a heat exchanger segment formed from the sacrificial ceramic core of FIG. 9.

FIG. 10 depicts a perspective cutaway view of the airfoil 112 after the casting process. The wall structure 140 of the outer shell 126 includes the heat exchanger segment 127 (shown partially in dashed lines). The cooling cavity 142 is shown disposed between the outer wall 160 and the inner wall 162. Inlet orifices 154 are in fluid communication between the cooling cavity 142 and the core 130 of the airfoil 112. Outlet orifices 156, shown in the outlet orifice arrangement shown in FIG. 9, are in fluid communication between the cooling cavity 142 and the exterior side 148 of the airfoil 112.

Figure 11:
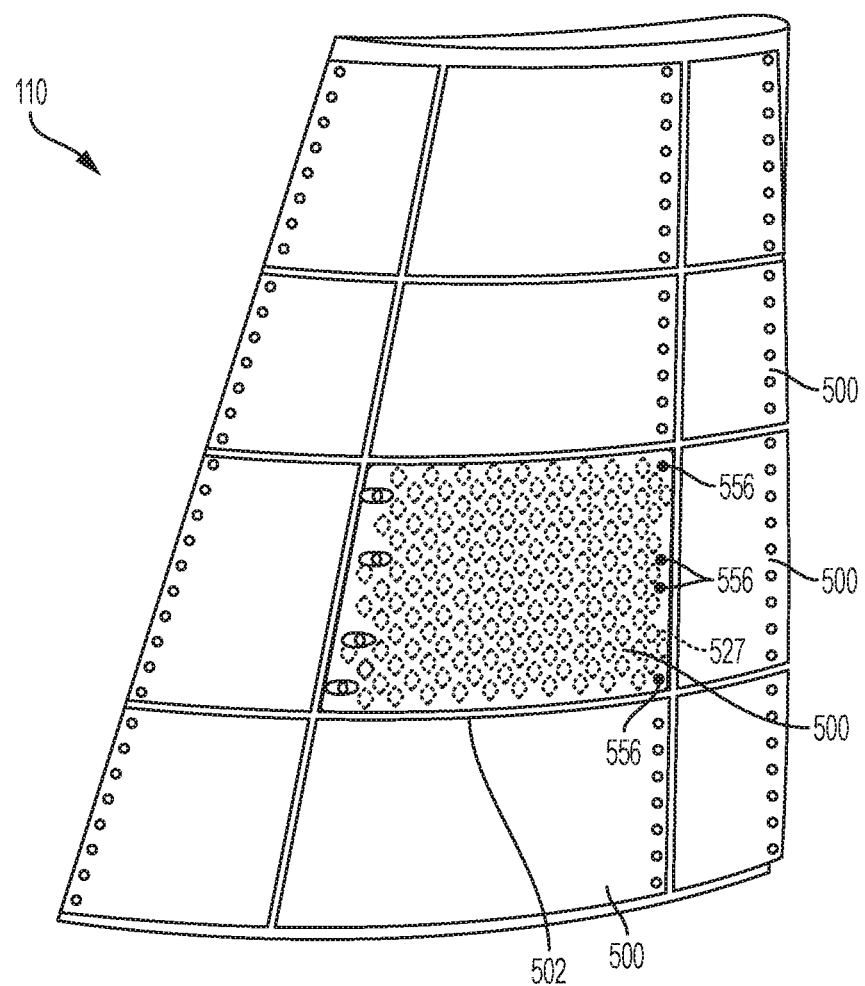
FIG. 11 illustrates an example of a component for the gas turbine engine having multiple regions with a sacrificial core.

FIG. 11 depicts an example of the component 110 in the form of the airfoil 112 having a plurality of cooling regions 500 segmented along the airfoil 112. Each cooling region 500 includes the heat exchanger segment 527 (shown in dashed lines) described herein. The cooling regions 500 may have the same or different heat transfer coefficients depending on the configuration of the heat exchanger segment 127 integrated into the wall structure 140 and cooling scheme strategy. The cooling regions 500 may be separated by a barrier 502 on one or more sides of the cooling region 500 formed, for example, by the material of the molten metal alloy. The cooling region 500 may be formed by the casting processes described herein, using the sacrificial ceramic cores 200 spaced from one another about the ceramic mass 201 by a gap that corresponds to the barrier 502. The sacrificial ceramic cores 200 may have the same configuration or different configurations depending on the desired heat transfer coefficient for the cooling regions. As shown, the outlet orifices 556 are shown along different portions of the cooling regions.

Figure 12:
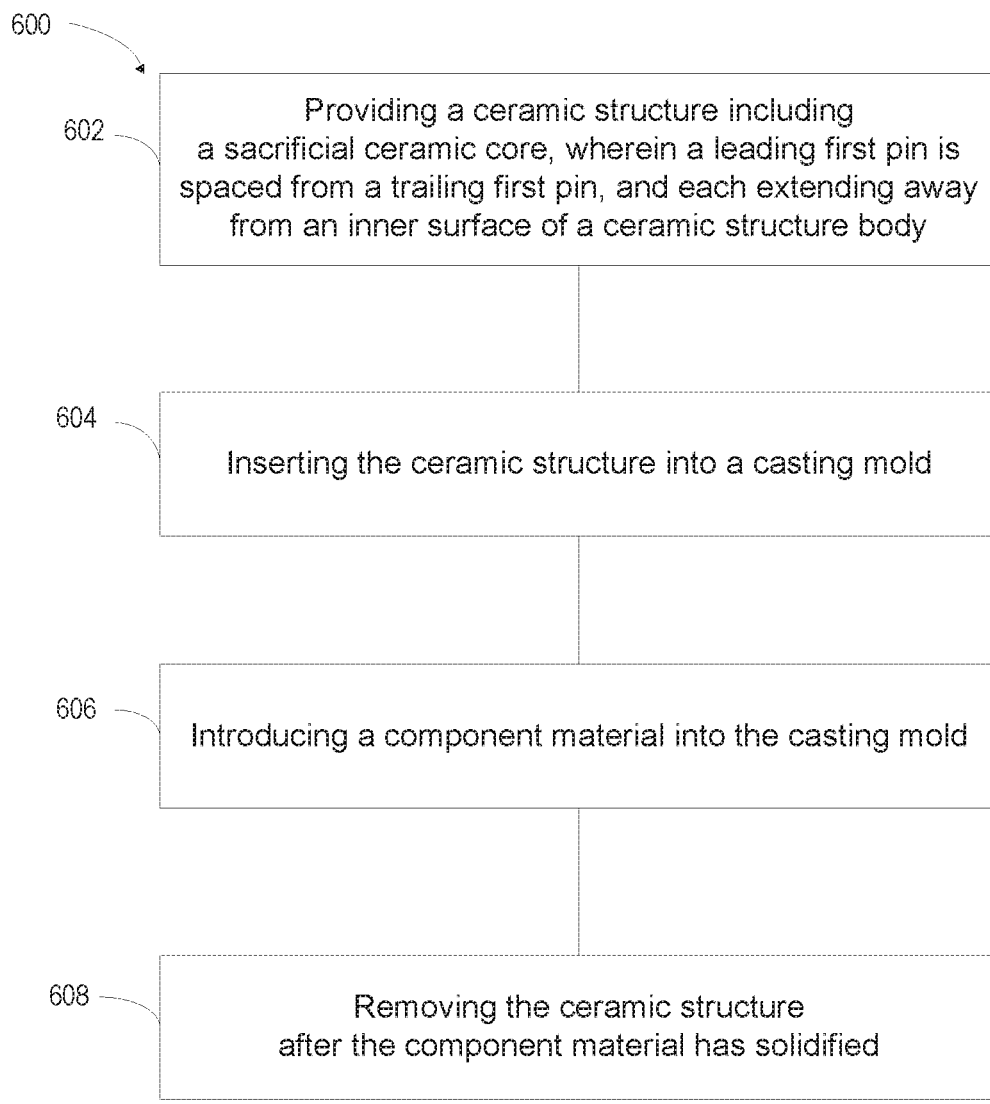
FIG. 12 depicts a flow diagram of a method of manufacturing a component for the gas turbine engine.

FIG. 12 depicts a flow diagram for a method 600 of manufacturing the component 110, including one or more of the following steps or any combination thereof. The method 600 described herein using the sacrificial ceramic cores 200 have shown an improvement in the investment casting process.

At step 602, a ceramic structure having one or more sacrificial ceramic cores 200 having any of the features described herein is provided. For example, the sacrificial ceramic core 200 may have a ceramic body corresponding to the cavity 142 of the heat exchanger segment 127. The ceramic body has an exterior surface being defined by an outer surface and an inner surface interconnected to one another by a leading edge, a trailing edge, a tip facing edge and a base facing edge. The ceramic body defines a plurality of apertures extending between the outer surface and the inner surface. The plurality of apertures correspond to a plurality of pedestals within the cavity of the heat exchanger segment. A trailing first pin and a leading first pin correspond to a first inlet orifice and a second inlet orifice, respectively, leading to the cavity of the heat exchanger segment. The trailing first pin and the leading first pin extend from the inner surface. The leading first pin may be spaced from the trailing first pin and in closer proximity to the leading edge than the trailing first pin.

In one example, additive manufacturing may be used to fabricate each sacrificial ceramic core 200. For example, successive sheet layers of mold material are built and stacked to create a three dimensional mold for the sacrificial ceramic core 200. Each single sheet layer of mold material may be fabricated to define areas of material and voids where appropriate. When single sheet layers of mold material are stacked successively and joined or attached together, for example, by an adhesive or cured, the three dimensional mold may be created having the desired three dimensional passageway from the adjoining areas of voids. The three dimensional mold may be appropriately sealed to form a core die capable of receiving and retaining ceramic slurry. Ceramic material may be introduced to three dimensional passageway and cured in order to define the desired shape of the sacrificial ceramic core 200. For example, the three dimensional mold with the mold material may then be surrounded by a ceramic shell such as by using a dipping process. After ceramic cures, the mold material may be then removed to reveal the sacrificial ceramic core 200. Mold material may function as a mold for casting a three dimensional ceramic structure, and which the mold material may then be removed from the sacrificial ceramic core 200 with a mold material removal process, such as, but not limited to, by dissolving, melting and/or vaporization without harming the sacrificial ceramic core 200. Mold materials may be selected to achieve desired properties, such as thermal expansion (relative to the ceramic material) and/or its mode of being removed from sacrificial ceramic core 200. Other processes may be included to build the three dimensional mold, such as the sheet layers themselves being casted in a respective mold (not shown) or being cut from an integrated sheet layers of mold material such as by laser cutting or water cutting.

The ceramic mass 201 and the first and/or second pins 230, 235 may be formed integral with the sacrificial ceramic cores 200, using the mold material to define the relative aspects of these features. Alternatively, the ceramic mass 201 and the first and/or second pins 230, 235 may be formed separately from the sacrificial ceramic cores 200 using additive manufacturing or injection molding processes, which are then later attached or fixed in a secure manner to the one or more sacrificial ceramic cores 200. Regardless, the sacrificial ceramic cores 200, the ceramic mass 201, the first and/or second pins 230, 235 may form the ceramic structure that may withstand the temperature requirements necessary to survive the casting of the molten metal alloy.

At step 604, the ceramic structure having the one or more sacrificial ceramic cores is inserted into a casting mold. Particularly, the ceramic structure defined at least in part by the one or more sacrificial ceramic core may be positioned within two joined halves of a metal casting mold. The casting mold defines an injection volume that corresponds to the desired shape of the airfoil 112 of the component 110. Melted wax may be vacuum injected into a wax mold around the ceramic structure. After the wax hardens, the wax mold halves are separated and removed to reveal the ceramic structure encased inside a wax pattern that corresponds to the shape of the airfoil 112. The wax pattern's outer surface may be then coated with a ceramic material, such as, for example, by a dipping process, to form the ceramic shell around the ceramic structure and wax pattern unit.

At step 606, a component material in the form of a molten metal alloy is introduced into the casting mold. Particularly, upon curing of the ceramic shell and removal of the wax, a completed ceramic casting mold is available to receive molten alloy in the investment casting process. Molten metal alloy material is then cast into the ceramic casing mold.

At step 608, the ceramic structure including the one or more sacrificial ceramic cores 200 is removed after the component material has solidified. Particularly, after the molten metal alloy has solidified, the ceramic structure, including the sacrificial ceramic cores 200, the ceramic mass 201, the first and/or second pins 230, 235, is removed by mechanical and/or chemical means to reveal the component 110 as a final cast alloy having the integrated heat exchanger segment 127 as shown in FIGS. 3 and 10. As described above, the outlet orifices may be formed leading from the cavity to the exterior of the component. In an example, one or more outlet orifices may be machined, with for example, by drilling or laser cutting, in the final cast alloy component such that the machined orifices are in fluid communication with the cooling cavity. In another example, one or more second pins may positioned to extend away from the outer surface of the ceramic body and form part of the ceramic structure prior to step 604.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

The subject-matter of the disclosure relates, among others, to the following aspects:

1. A method of manufacturing a gas turbine engine component, comprising:
   providing a ceramic structure including a sacrificial ceramic core, the sacrificial ceramic core having a ceramic body corresponding to a cooling cavity of a heat exchanger segment, the ceramic body having an exterior surface comprising an outer surface and an inner surface interconnected to one another by a leading edge, a trailing edge, a tip facing edge and a base facing edge, the ceramic body defining a plurality of apertures extending between the outer surface and the inner surface, the plurality of apertures corresponding to a plurality of pedestals within the cooling cavity of the heat exchanger segment, the ceramic body including a trailing first pin and a leading first pin corresponding to a first inlet orifice and a second inlet orifice leading to the cooling cavity of the heat exchanger segment, the trailing first pin and the leading first pin extending away from the inner surface, the leading first pin spaced from the trailing first pin and in closer proximity to the leading edge than the trailing first pin;
   inserting the ceramic structure into a casting mold;
   introducing a component material into the casting mold; and
   removing the ceramic structure after the component material has solidified to a casted component, the cast component including the heat exchanger element having the cooling cavity where the sacrificial ceramic core was disposed.

2. The method of aspect 1, wherein at least one of the trailing first pin and the leading first pin of the sacrificial ceramic core is obliquely angled relative to the inner surface.

3. The method of aspect 2, wherein the trailing first pin is obliquely angled relative to the inner surface, wherein a core end of the trailing first pin is closer to the trailing edge than a cavity end of the trailing first pin, wherein the cavity end of the trailing first pin is closer proximity to the inner surface than the core end of the trailing first pin.

4. The method of aspect 3, wherein the leading first pin is obliquely angled relative to the inner surface, wherein a core end of the leading first pin is closer to the leading edge than a cavity end of the leading first pin, wherein the cavity end of the leading first pin is closer proximity to the inner surface than the core end of the leading first pin.

5. The method as in any of aspects 2-4, wherein the leading first pin is obliquely angled relative to the inner surface, wherein a core end of the leading first pin is closer to the leading edge than a cavity end of the leading first pin, wherein the cavity end of the leading first pin is closer proximity to the inner surface than the core end of the leading first pin.

6. The method as in any of aspects 1-5, further comprising forming an outlet orifice in the casted component that is in fluid communication with the cooling cavity.

7. The method of aspect 6, wherein the forming an outlet orifice step comprises providing a second pin extending away from the outer surface of the ceramic body.

8. The method of aspect 6, wherein the forming an outlet orifice step comprises machining the outlet orifice into the casted component after the removing step.

9. The method as in any of aspects 6-8, wherein the outlet orifice is obliquely angled.

10. The method as in any of aspects 6-9, wherein the outlet orifice is disposed in an intermediate zone between the leading edge and the trailing edge.

11. The method as in any of aspects 6-10, wherein the ceramic body further defines a channel corresponding to a partition disposed within the cooling cavity of the heat exchanger segment, the channel extending between the outer surface and the inner surface and disposed between the formed outlet orifice and the leading first pin.

12. The method as in any of aspects 6-11, wherein the ceramic body further defines a C-shaped opening extending between the outer surface and the inner surface and disposed proximate the leading first pin, the C-shaped opening corresponding to a diffuser element within the cooling cavity of the heat exchanger segment.

13. The method as in any of aspects 1-12, wherein the ceramic body includes a second leading first pin corresponding to a third inlet orifice and a second trailing first pin corresponding to a fourth inlet orifice, the third inlet orifice and the fourth inlet orifice leading to the cooling cavity of the heat exchanger segment, and extending away from the inner surface, wherein the second leading first pin is spaced from the trailing first pin and in closer proximity to the leading edge than the trailing first pin, wherein a distance between the leading first pin and the second leading first pin is less than a distance between the trailing first pin and the second trailing first pin.

14. The method as in any of aspects 1-13, wherein the ceramic structure includes a ceramic mass, and the leading first pin and the trailing first pin coupled between the ceramic mass and the sacrificial ceramic core.

15. The method of aspect 14, wherein the ceramic structure includes another sacrificial ceramic core disposed about the ceramic mass.

16. A gas turbine engine component, comprising:
a wall structure defining a core, the wall structure having an exterior surface and an interior surface opposite the exterior surface, the interior surface facing the core; and
a heat exchanger segment integrated into a region of the wall structure, the heat exchanger segment comprising a single contiguous piece including a cooling cavity defined by at least an outer wall corresponding to the exterior surface, an inner wall corresponding to the interior surface, a leading internal surface, and a trailing internal surface opposite the leading internal surface, the leading internal surface and the trailing internal surface extending between the outer wall and the inner wall,
wherein the wall structure includes a plurality of pedestals disposed within the cooling cavity, interconnecting the outer wall to the inner wall,
wherein the inner wall of the heat exchanger segment defines a first inlet orifice and a second inlet orifice, the first inlet orifice and the second inlet orifice extending between the cooling cavity and the core, the second inlet orifice spaced from the first inlet orifice and in closer proximity to the leading internal surface than the first inlet orifice, wherein the outer wall of the heat exchanger segment defines an outlet orifice extending between the cooling cavity and the exterior surface.

17. The gas turbine engine component of aspect 16, wherein the inner wall of the heat exchanger segment defines a third inlet orifice extending between the cooling cavity and the core, the third inlet orifice spaced from the first inlet orifice and in closer proximity to the leading internal surface than the first inlet orifice, and wherein the inner wall of the heat exchanger segment defines a fourth inlet orifice extending between the cooling cavity and the core, the second and third inlet orifices spaced from the fourth inlet orifice and in closer proximity to the leading internal surface than the fourth inlet orifice, the first inlet orifice and the fourth inlet orifice disposed along the trailing internal surface, and the second inlet orifice and the third inlet orifice disposed along the leading internal surface.

18. The gas turbine engine component of aspect 17, wherein the outlet orifice is a first outlet orifice, the outer wall of the heat exchanger segment defining a second outlet orifice extending between the cooling cavity and the exterior surface, wherein the first outlet orifice and the second outlet orifice are disposed along the leading internal surface.

19. The gas turbine engine component of aspect 17, wherein the outlet orifice is a first outlet orifice, the outer wall of the heat exchanger segment defining a second outlet orifice extending between the cooling cavity and the exterior surface, wherein the first outlet orifice and the second outlet orifice are in an intermediate zone that is disposed between the leading internal surface and the trailing internal surface.

20. A sacrificial ceramic core used to form a heat exchanger segment within a casted component, comprising:
a ceramic body including an exterior surface comprising an outer surface and an inner surface interconnected to one another by a leading edge, a trailing edge, a tip facing edge and a base facing edge, the ceramic body defining a plurality of apertures extending between the outer surface and the inner surface, and including a trailing first pin and a leading first pin each formed of a ceramic, the trailing first pin and the leading first pin extending away from the inner surface, the leading first pin spaced from the trailing first pin and in closer proximity to the leading edge than the trailing first pin,
wherein the trailing first pin is obliquely angled relative to the inner surface, wherein a core end of the trailing first pin is closer to the trailing edge than a cavity end of the trailing first pin, wherein the cavity end of the trailing first pin is closer proximity to the inner surface than the core end of the trailing first pin, and wherein the leading first pin is obliquely angled relative to the inner surface, wherein a core end of the leading first pin is closer to the leading edge than a cavity end of the leading first pin, wherein the cavity end of the leading first pin is closer proximity to the inner surface than the core end of the leading first pin.

While various embodiments have been described, it will be apparent to those of ordinary skill in the art that many more embodiments and implementations are possible. Accordingly, the embodiments described herein are examples, not the only possible embodiments and implementations. Furthermore, the advantages described above are not necessarily the only advantages, and it is not necessarily expected that all of the described advantages will be achieved with every embodiment.

What is claimed is:

1. A method of manufacturing a gas turbine engine component, comprising:
providing a ceramic structure including a sacrificial ceramic core, the sacrificial ceramic core having a ceramic body corresponding to a cooling cavity of a heat exchanger segment, the ceramic body having an exterior surface comprising an outer surface and an inner surface interconnected to one another by a leading edge, a trailing edge, a tip facing edge and a base facing edge, the ceramic body defining a plurality of apertures extending between the outer surface and the inner surface, the plurality of apertures corresponding to a plurality of pedestals within the cooling cavity of the heat exchanger segment, the ceramic body including a trailing first pin and a leading first pin corresponding to a first inlet orifice and a second inlet orifice leading to the cooling cavity of the heat exchanger segment, the trailing first pin and the leading first pin extending away from the inner surface, the leading first pin spaced from the trailing first pin and in closer proximity to the leading edge than the trailing first pin;
inserting the ceramic structure into a casting mold;
introducing a component material into the casting mold; and
removing the ceramic structure after the component material has solidified to a casted component, the casted component including the heat exchanger segment having the cooling cavity where the sacrificial ceramic core was disposed.

2. The method of claim 1, wherein at least one of the trailing first pin and the leading first pin of the sacrificial ceramic core is obliquely angled relative to the inner surface.

3. The method of claim 2, wherein the trailing first pin is obliquely angled relative to the inner surface, wherein a core end of the trailing first pin is closer to the trailing edge than a cavity end of the trailing first pin, wherein the cavity end of the trailing first pin is closer proximity to the inner surface than the core end of the trailing first pin.

4. The method of claim 3, wherein the leading first pin is obliquely angled relative to the inner surface, wherein a core end of the leading first pin is closer to the leading edge than a cavity end of the leading first pin, wherein the cavity end of the leading first pin is closer proximity to the inner surface than the core end of the leading first pin.

5. The method of claim 2, wherein the leading first pin is obliquely angled relative to the inner surface, wherein a core end of the leading first pin is closer to the leading edge than a cavity end of the leading first pin, wherein the cavity end of the leading first pin is closer proximity to the inner surface than the core end of the leading first pin.

6. The method of claim 1, further comprising forming an outlet orifice in the casted component that is in fluid communication with the cooling cavity.

7. The method of claim 6, wherein the forming an outlet orifice step comprises providing a second pin extending away from the outer surface of the ceramic body.

8. The method of claim 6, wherein the forming an outlet orifice step comprises machining the outlet orifice into the casted component after the removing step.

9. The method of claim 6, wherein the outlet orifice is obliquely angled.

10. The method of claim 6, wherein the outlet orifice is disposed in an intermediate zone between the leading edge and the trailing edge.

11. The method of claim 6, wherein the ceramic body further defines a channel corresponding to a partition disposed within the cooling cavity of the heat exchanger segment, the channel extending between the outer surface and the inner surface and disposed between the formed outlet orifice and the leading first pin.

12. The method of claim 6, wherein the ceramic body further defines a C-shaped opening extending between the outer surface and the inner surface and disposed proximate the leading first pin, the C-shaped opening corresponding to a diffuser element within the cooling cavity of the heat exchanger segment.

13. The method of claim 1, wherein the ceramic body includes a second leading first pin corresponding to a third inlet orifice and a second trailing first pin corresponding to a fourth inlet orifice, the third inlet orifice and the fourth inlet orifice leading to the cooling cavity of the heat exchanger segment, and extending away from the inner surface, wherein the second leading first pin is spaced from the trailing first pin and in closer proximity to the leading edge than the trailing first pin, wherein a distance between the leading first pin and the second leading first pin is less than a distance between the trailing first pin and the second trailing first pin.

14. The method of claim 1, wherein the ceramic structure includes a ceramic mass, and the leading first pin and the trailing first pin coupled between the ceramic mass and the sacrificial ceramic core.

15. The method of claim 14, wherein the ceramic structure includes another sacrificial ceramic core disposed about the ceramic mass.

* * * * *